(12) United States Patent
Morgan et al.

(10) Patent No.: US 9,378,480 B2
(45) Date of Patent: Jun. 28, 2016

(54) METHODS AND SYSTEMS RELATED TO ASSET IDENTIFICATION TRIGGERED GEOFENCING

(71) Applicant: **Gordon*Howard Associates, Inc.**, Littleton, CO (US)

(72) Inventors: Gerald A. Morgan, Littleton, CO (US); Christopher M. Macheca, Centennial, CO (US); Stanley G. Schwarz, Indialantic, FL (US)

(73) Assignee: **GORDON*HOWARD ASSOCIATES, INC.**, Littleton, CO (US)

( * ) Notice: Subject to any disclaimer, the term of this patent is extended or adjusted under 35 U.S.C. 154(b) by 30 days.

(21) Appl. No.: 13/827,652

(22) Filed: Mar. 14, 2013

(65) Prior Publication Data

US 2014/0279293 A1 Sep. 18, 2014

(51) Int. Cl.
*G08B 1/08* (2006.01)
*G06Q 10/08* (2012.01)
*G08B 21/02* (2006.01)
*G08B 13/14* (2006.01)
*G07C 5/00* (2006.01)
*G07C 5/08* (2006.01)

(52) U.S. Cl.
CPC ............. *G06Q 10/087* (2013.01); *G07C 5/008* (2013.01); *G07C 5/0858* (2013.01); *G08B 13/1427* (2013.01); *G08B 21/0261* (2013.01); *G08B 21/0269* (2013.01)

(58) Field of Classification Search
CPC .. G07C 5/008; G07C 5/0858; G08B 21/0261; G08B 21/0269; G08B 13/1427
See application file for complete search history.

(56) References Cited

U.S. PATENT DOCUMENTS

| 4,335,370 A | 6/1982 | Scalley et al. |
| 4,592,443 A | 6/1986 | Simon |
| 4,624,578 A | 11/1986 | Green |
| 4,688,026 A | 8/1987 | Scribner et al. |
| 4,700,296 A | 10/1987 | Palmer, Jr. et al. |
| 4,736,294 A | 4/1988 | Gill et al. |
| 4,738,333 A | 4/1988 | Collier et al. |
| 4,800,590 A | 1/1989 | Vaughan |
| 5,014,206 A | 5/1991 | Scribner et al. |
| 5,132,968 A | 7/1992 | Cephus |
| 5,228,083 A | 7/1993 | Lozowick et al. |
| 5,426,415 A | 6/1995 | Prachar et al. |

(Continued)

FOREIGN PATENT DOCUMENTS

| EP | 1557807 | 7/2005 |
| KR | 10-2004-0073816 | 8/2004 |

(Continued)

OTHER PUBLICATIONS

US 5,699,633, 10/1999, Roser (withdrawn).

(Continued)

*Primary Examiner* — Mussa A Shaawat
(74) *Attorney, Agent, or Firm* — Conley Rose, P.C.

(57) ABSTRACT

At least some of the example embodiments are methods including: coupling a tracking device to a vehicle being part of a dealer inventory, the vehicle having an identification number; associating the identification number with the tracking device; creating a geo-fence boundary containing a location of the vehicle; and sending a first message to a lien-holder indicating the vehicle has crossed the geo-fence boundary.

22 Claims, 5 Drawing Sheets

(56) References Cited

U.S. PATENT DOCUMENTS

| | | | |
|---|---|---|---|
| 5,490,200 A | 2/1996 | Snyder et al. |
| 5,495,531 A | 2/1996 | Smiedt |
| 5,510,780 A | 4/1996 | Norris et al. |
| 5,619,573 A | 4/1997 | Brinkmeyer et al. |
| 5,673,318 A | 9/1997 | Bellare et al. |
| 5,708,712 A | 1/1998 | Brinkmeyer et al. |
| 5,775,290 A | 7/1998 | Staerzi et al. |
| 5,797,134 A | 8/1998 | McMillan et al. |
| 5,818,725 A | 10/1998 | McNamara et al. |
| 5,819,869 A | 10/1998 | Horton |
| 5,898,391 A | 4/1999 | Jefferies et al. |
| 5,917,405 A | 6/1999 | Joao |
| 5,940,812 A | 8/1999 | Tengel et al. |
| 5,969,633 A | 10/1999 | Rosler |
| 5,970,143 A | 10/1999 | Schneier et al. |
| 6,025,774 A | 2/2000 | Forbes |
| 6,026,922 A | 2/2000 | Horton |
| 6,032,258 A | 2/2000 | Godoroja et al. |
| 6,064,970 A | 5/2000 | McMillan et al. |
| 6,088,143 A | 7/2000 | Bang |
| 6,130,621 A | 10/2000 | Weiss |
| 6,157,317 A | 12/2000 | Walker |
| 6,185,307 B1 | 2/2001 | Johnson, Jr. |
| 6,195,648 B1 | 2/2001 | Simon et al. |
| 6,225,890 B1 | 5/2001 | Murphy |
| 6,232,874 B1 | 5/2001 | Murphy |
| 6,233,566 B1 | 5/2001 | Levine et al. |
| 6,249,217 B1 | 6/2001 | Forbes |
| 6,249,227 B1 * | 6/2001 | Brady et al. ............... 340/572.1 |
| 6,278,936 B1 | 8/2001 | Jones |
| 6,353,776 B1 | 3/2002 | Rohrl et al. |
| 6,370,649 B1 | 4/2002 | Angelo et al. |
| 6,380,848 B1 | 4/2002 | Weigl et al. |
| 6,401,204 B1 | 6/2002 | Euchner et al. |
| 6,429,773 B1 | 8/2002 | Schuyler |
| 6,489,897 B2 | 12/2002 | Simon |
| 6,587,739 B1 | 7/2003 | Abrams et al. |
| 6,601,175 B1 | 7/2003 | Arnold et al. |
| 6,611,201 B1 | 8/2003 | Bishop et al. |
| 6,611,686 B1 | 8/2003 | Smith et al. |
| 6,615,186 B1 | 9/2003 | Kolls |
| 6,665,613 B2 | 12/2003 | Duvall |
| 6,693,517 B2 | 2/2004 | McCarthy et al. |
| 6,714,859 B2 | 3/2004 | Jones |
| 6,717,527 B2 | 4/2004 | Simon |
| 6,741,927 B2 | 5/2004 | Jones |
| 6,804,606 B2 | 10/2004 | Jones |
| 6,812,829 B1 | 11/2004 | Flick |
| 6,816,089 B2 | 11/2004 | Flick |
| 6,816,090 B2 | 11/2004 | Teckchandani et al. |
| 6,828,692 B2 | 12/2004 | Simon |
| 6,868,386 B1 | 3/2005 | Henderson et al. |
| 6,870,467 B2 | 3/2005 | Simon |
| 6,873,824 B2 | 3/2005 | Flick |
| 6,888,495 B2 | 5/2005 | Flick |
| 6,917,853 B2 | 7/2005 | Chirnomas |
| 6,924,750 B2 | 8/2005 | Flick |
| 6,950,807 B2 | 9/2005 | Brock |
| 6,952,645 B2 | 10/2005 | Jones |
| 6,961,001 B1 | 11/2005 | Chang et al. |
| 6,972,667 B2 | 12/2005 | Flick |
| 6,985,583 B1 | 1/2006 | Brainard et al. |
| 6,993,658 B1 | 1/2006 | Engberg et al. |
| 7,005,960 B2 | 2/2006 | Flick |
| 7,015,830 B2 | 3/2006 | Flick |
| 7,020,798 B2 | 3/2006 | Meng et al. |
| 7,031,826 B2 | 4/2006 | Flick |
| 7,031,835 B2 | 4/2006 | Flick |
| 7,039,811 B2 | 5/2006 | Ito |
| 7,053,823 B2 | 5/2006 | Cervinka et al. |
| 7,061,137 B2 | 6/2006 | Flick |
| 7,091,822 B2 | 8/2006 | Flick et al. |
| 7,103,368 B2 | 9/2006 | Teshima |
| 7,123,128 B2 | 10/2006 | Mullet et al. |
| 7,124,088 B2 | 10/2006 | Bauer et al. |
| 7,133,685 B2 | 11/2006 | Hose et al. |
| 7,142,089 B2 | 11/2006 | Yamagishi |
| 7,149,623 B2 | 12/2006 | Flick |
| 7,205,679 B2 | 4/2007 | Flick |
| 7,224,083 B2 | 5/2007 | Flick |
| 7,266,507 B2 | 9/2007 | Simon et al. |
| 7,292,152 B2 | 11/2007 | Torkkola et al. |
| 7,299,890 B2 | 11/2007 | Mobley |
| 7,310,618 B2 | 12/2007 | Libman |
| 7,323,982 B2 | 1/2008 | Staton et al. |
| 7,327,250 B2 | 2/2008 | Harvey |
| 7,379,805 B2 | 5/2008 | Olsen, III et al. |
| 7,389,916 B2 | 6/2008 | Chirnomas |
| 7,427,924 B2 | 9/2008 | Ferrone et al. |
| 7,542,921 B1 | 6/2009 | Hildreth |
| 7,561,102 B2 | 7/2009 | Duvall |
| 7,814,005 B2 | 10/2010 | Imrey et al. |
| 7,818,254 B1 | 10/2010 | Ma |
| 7,823,681 B2 | 11/2010 | Crespo et al. |
| 7,873,455 B2 | 1/2011 | Arshad et al. |
| 7,877,269 B2 | 1/2011 | Bauer et al. |
| 7,904,332 B1 | 3/2011 | Merkley |
| 7,930,211 B2 | 4/2011 | Crolley |
| 8,018,329 B2 | 9/2011 | Morgan et al. |
| 8,086,523 B1 | 12/2011 | Palmer |
| 8,095,394 B2 | 1/2012 | Nowak et al. |
| 8,140,358 B1 | 3/2012 | Ling et al. |
| 8,217,772 B2 | 7/2012 | Morgan et al. |
| 8,325,025 B2 | 12/2012 | Morgan et al. |
| 8,344,894 B2 | 1/2013 | Szczerba et al. |
| 8,370,027 B2 | 2/2013 | Pettersson et al. |
| 8,370,925 B2 | 2/2013 | Childress et al. |
| 8,510,556 B2 | 8/2013 | Cao et al. |
| 8,630,768 B2 | 1/2014 | McClellan et al. |
| 8,653,956 B2 | 2/2014 | Berkobin et al. |
| 8,754,751 B1 | 6/2014 | Piccoli |
| 8,841,987 B1 | 9/2014 | Stanfield et al. |
| 9,002,536 B2 | 4/2015 | Hatton |
| 2001/0034577 A1 | 10/2001 | Grounds et al. |
| 2001/0040503 A1 | 11/2001 | Bishop |
| 2002/0019055 A1 | 2/2002 | Brown |
| 2002/0091473 A1 | 7/2002 | Gardner et al. |
| 2002/0120371 A1 | 8/2002 | Levian et al. |
| 2002/0120374 A1 | 8/2002 | Douros |
| 2002/0193926 A1 | 12/2002 | Katagishi et al. |
| 2003/0036823 A1 | 2/2003 | Mahvi |
| 2003/0095046 A1 | 5/2003 | Borugian |
| 2003/0101120 A1 | 5/2003 | Tilton |
| 2003/0151501 A1 | 8/2003 | Teckchandani et al. |
| 2003/0191583 A1 | 10/2003 | Uhlmann et al. |
| 2003/0231550 A1 | 12/2003 | MacFarlane |
| 2004/0088345 A1 | 5/2004 | Zellner et al. |
| 2004/0153362 A1 | 8/2004 | Bauer et al. |
| 2004/0176978 A1 | 9/2004 | Simon et al. |
| 2004/0177034 A1 | 9/2004 | Simon et al. |
| 2004/0203974 A1 | 10/2004 | Seibel et al. |
| 2004/0204795 A1 | 10/2004 | Harvey et al. |
| 2004/0239510 A1 | 12/2004 | Karsten |
| 2005/0017855 A1 | 1/2005 | Harvey |
| 2005/0024203 A1 * | 2/2005 | Wolfe ............... 340/539.22 |
| 2005/0030184 A1 | 2/2005 | Victor |
| 2005/0033483 A1 | 2/2005 | Simon et al. |
| 2005/0128080 A1 * | 6/2005 | Hall et al. ............... 340/539.26 |
| 2005/0134438 A1 | 6/2005 | Simon |
| 2005/0162016 A1 | 7/2005 | Simon |
| 2005/0200453 A1 * | 9/2005 | Turner et al. ............... 340/5.61 |
| 2005/0231323 A1 | 10/2005 | Underdahl et al. |
| 2005/0270178 A1 | 12/2005 | Ioli |
| 2006/0028431 A1 | 2/2006 | Leong |
| 2006/0059109 A1 | 3/2006 | Grimes |
| 2006/0080599 A1 | 4/2006 | Dubinsky |
| 2006/0100944 A1 | 5/2006 | Reddin et al. |
| 2006/0108417 A1 | 5/2006 | Simon |
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0021100 A1 * | 1/2007 | Haave et al. ............... 455/404.2 |
| 2007/0082614 A1 | 4/2007 | Mock |

(56) References Cited

U.S. PATENT DOCUMENTS

| | | | |
|---|---|---|---|
| 2007/0139189 A1 | 6/2007 | Helmig | |
| 2007/0146146 A1 | 6/2007 | Kopf et al. | |
| 2007/0176771 A1 | 8/2007 | Doyle | |
| 2007/0179692 A1* | 8/2007 | Smith | G06Q 10/06315 701/32.4 |
| 2007/0185728 A1 | 8/2007 | Schwarz et al. | |
| 2007/0194881 A1 | 8/2007 | Schwarz et al. | |
| 2007/0222588 A1* | 9/2007 | Wolfe | 340/539.13 |
| 2007/0224939 A1 | 9/2007 | Jung et al. | |
| 2007/0285207 A1 | 12/2007 | Bates | |
| 2007/0288271 A1 | 12/2007 | Klinkhammer | |
| 2007/0299567 A1 | 12/2007 | Simon et al. | |
| 2008/0042814 A1 | 2/2008 | Hurwitz et al. | |
| 2008/0109378 A1 | 5/2008 | Papadimitriou | |
| 2008/0114541 A1 | 5/2008 | Shintani et al. | |
| 2008/0150683 A1 | 6/2008 | Mikan et al. | |
| 2008/0162034 A1 | 7/2008 | Breen | |
| 2008/0221743 A1 | 9/2008 | Schwarz et al. | |
| 2008/0223646 A1 | 9/2008 | White | |
| 2008/0231446 A1 | 9/2008 | Cresto | |
| 2008/0243558 A1 | 10/2008 | Gupte | |
| 2008/0245598 A1 | 10/2008 | Gratz et al. | |
| 2008/0255722 A1 | 10/2008 | McClellan et al. | |
| 2008/0294302 A1 | 11/2008 | Basir | |
| 2009/0043409 A1 | 2/2009 | Ota | |
| 2009/0051510 A1 | 2/2009 | Follmer et al. | |
| 2009/0182216 A1 | 7/2009 | Roushey, III et al. | |
| 2009/0234770 A1 | 9/2009 | Simon | |
| 2009/0237249 A1* | 9/2009 | Bielas | 340/572.1 |
| 2009/0248222 A1 | 10/2009 | McGarry et al. | |
| 2009/0284359 A1 | 11/2009 | Huang et al. | |
| 2009/0284367 A1* | 11/2009 | Pfafman | G08B 21/0238 340/539.1 |
| 2009/0295537 A1* | 12/2009 | Lane et al. | 340/5.82 |
| 2010/0030586 A1 | 2/2010 | Taylor et al. | |
| 2010/0045452 A1 | 2/2010 | Periwai | |
| 2010/0075655 A1 | 3/2010 | Howarter et al. | |
| 2010/0090826 A1* | 4/2010 | Moran | G08B 13/1427 340/539.13 |
| 2010/0148947 A1 | 6/2010 | Morgan et al. | |
| 2010/0238009 A1 | 9/2010 | Cook et al. | |
| 2010/0268402 A1 | 10/2010 | Schwarz et al. | |
| 2010/0312691 A1 | 12/2010 | Johnson, Jr. | |
| 2011/0040630 A1 | 2/2011 | Weiss | |
| 2011/0050407 A1 | 3/2011 | Schoenfeld et al. | |
| 2011/0057800 A1 | 3/2011 | Sofer | |
| 2011/0084820 A1 | 4/2011 | Walter et al. | |
| 2011/0148626 A1* | 6/2011 | Acevedo | 340/539.13 |
| 2011/0153143 A1 | 6/2011 | O'Neil et al. | |
| 2011/0210867 A1 | 9/2011 | Benedikt | |
| 2011/0270779 A1 | 11/2011 | Showalter | |
| 2012/0066011 A1 | 3/2012 | Ichien et al. | |
| 2012/0068858 A1 | 3/2012 | Fredkin | |
| 2012/0068886 A1* | 3/2012 | Torres | 342/357.74 |
| 2012/0089423 A1 | 4/2012 | Tamir et al. | |
| 2012/0098678 A1 | 4/2012 | Rathmacher et al. | |
| 2012/0158356 A1* | 6/2012 | Prochaska et al. | 702/165 |
| 2012/0203441 A1* | 8/2012 | Higgins et al. | 701/102 |
| 2012/0212353 A1 | 8/2012 | Fung et al. | |
| 2012/0221216 A1 | 8/2012 | Chauncey et al. | |
| 2013/0018677 A1 | 1/2013 | Chevrette | |
| 2013/0074107 A1* | 3/2013 | Hyde et al. | 725/5 |
| 2013/0074111 A1* | 3/2013 | Hyde et al. | 725/25 |
| 2013/0074112 A1* | 3/2013 | Hyde et al. | 725/25 |
| 2013/0074115 A1* | 3/2013 | Hyde et al. | 725/30 |
| 2013/0099892 A1 | 4/2013 | Tucker et al. | |
| 2013/0127617 A1* | 5/2013 | Baade et al. | 340/539.31 |
| 2013/0138460 A1 | 5/2013 | Schumann et al. | |
| 2013/0141252 A1* | 6/2013 | Ricci | 340/932.2 |
| 2013/0144460 A1* | 6/2013 | Ricci | 701/1 |
| 2013/0144461 A1 | 6/2013 | Ricci | |
| 2013/0144469 A1* | 6/2013 | Ricci | 701/2 |
| 2013/0144770 A1 | 6/2013 | Boling et al. | |
| 2013/0144771 A1 | 6/2013 | Boling et al. | |
| 2013/0144805 A1 | 6/2013 | Boling et al. | |
| 2013/0204455 A1 | 8/2013 | Chia et al. | |
| 2013/0338992 A1 | 12/2013 | Weiss | |
| 2014/0191858 A1 | 7/2014 | Morgan et al. | |
| 2014/0225724 A1 | 8/2014 | Rankin et al. | |
| 2014/0358896 A1 | 12/2014 | Camacho et al. | |

FOREIGN PATENT DOCUMENTS

| | | |
|---|---|---|
| WO | 9616845 | 6/1996 |
| WO | 2007092272 | 8/2007 |
| WO | 2007092287 | 8/2007 |
| WO | 2010/068438 A2 | 6/2010 |
| WO | 2012-097441 | 7/2012 |

OTHER PUBLICATIONS

On Time Payment Protection Systems, printed Jan. 2, 2004 from www.ontime-pps. com/how.html.

Aircept Products, printed Jan. 2, 2004 from www. aircept. com/products.html.

How PayTeck Works, printed Jan. 2, 2004 from www. payteck.cc/aboutpayteck.html.

Article: "Pager Lets You Locate Your Car, Unlock and Start It", published Dec. 10, 1997 in USA Today.

Article: "Electronic Keys Keep Tabs on Late Payers", published Sep. 22, 1997 in Nonprime Auto News.

Article: "PASSTEC Device Safely Prevents Vehicles from Starting", published Jul. 19, 1999 in Used Car News.

Payment Clock Disabler advertisement, published, May 18, 1998.

Secure Your Credit & Secure Your Investment (Pay Teck advertisement), printed Jan. 2, 2004 from www. payteck.cc.

iMetrik Company Information, printed Dec. 21, 2006 from imetrik.com.

About C-CHIP Technologies, printed Dec. 21, 2006 from www.c-chip.com.

HI-Tech tools to solve traditional problems, printed Dec. 21, 2006 from www.c-chip.com.

C-CHIP Technologies Products: Credit Chip 100, Credit Chip 100C, Credit Chip 200, printed Dec. 21, 2006 from www. c-chip.com.

The Credit Chip 100, printed Dec. 21, 2006 from www.c-chip.com.

EEC-EN0F204RK Panasonic Electronic Components | P14164CT-ND | DigiKey. Web. Accessed Feb. 13, 2013. www.digikey.com/product-detail/en/EEC-EN0F204RK/P14164CT-ND/1937322.

Fogerson, R. et al. "Qualitative Detection of Opiates in Sweat by EIA and GC-MS". Journal of Analytical Toxicology. Oct. 6, 1997, vol. 21, No. 6, pp. 451-458(8) (Abstract).

De La Torre, R. et al. "Usefulness of Sweat Testing for the Detection of Cannabis Smoke." 2004 American Association for Clinical Chemistry, Inc. 29th Arnold O. Beckman Conference. Apr. 12-13, 2011. San Diego, CA.

Credit Chip 200G Series and The Credit Chip 200G Series, C-Chip Technologies Corp., date unknown.

C-Chip Technologies User Guide, C-Chip Technologies Corp., date unknown.

\* cited by examiner

FIG.5 official # METHODS AND SYSTEMS RELATED TO ASSET IDENTIFICATION TRIGGERED GEOFENCING

BACKGROUND

In situations where a financing institution has provided funds for a dealership to purchase items for inventory, the financing institution may have an interest in protecting its investment by maintaining records on the inventory of the assets over time. Taking multiple physical inventories over time to maintain the records may be time consuming and prone to human counting error. Thus, any technology which provides a more accurate and easier way to inventory assets is beneficial.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

"Remote" shall mean one kilometer or more.

"Portable computing device" shall mean a handheld device having the ability to execute software instructions running on the device and communicate over a wireless data network. The portable computing device configured to operate exclusively from power derived from an internal battery for an hour or more.

"Dealer inventory" shall mean a group of assets owned or equitably owned by a dealership and offered for sale as the primary product offering of the dealer.

"Lien-holder" shall mean a person or institution who has provided financing for an asset and having a lien on the asset.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to systems and methods of associating a tracking device with a specific asset, such as a vehicle, and subsequently tracking location of the asset. The developmental context is location tracking of vehicles in dealer inventory, and thus the specification will be based on the development context; however, the developmental context shall not be read as a limitation as to the applicability of the various embodiments. The specification first turns to a high level system overview.

Figure 1:
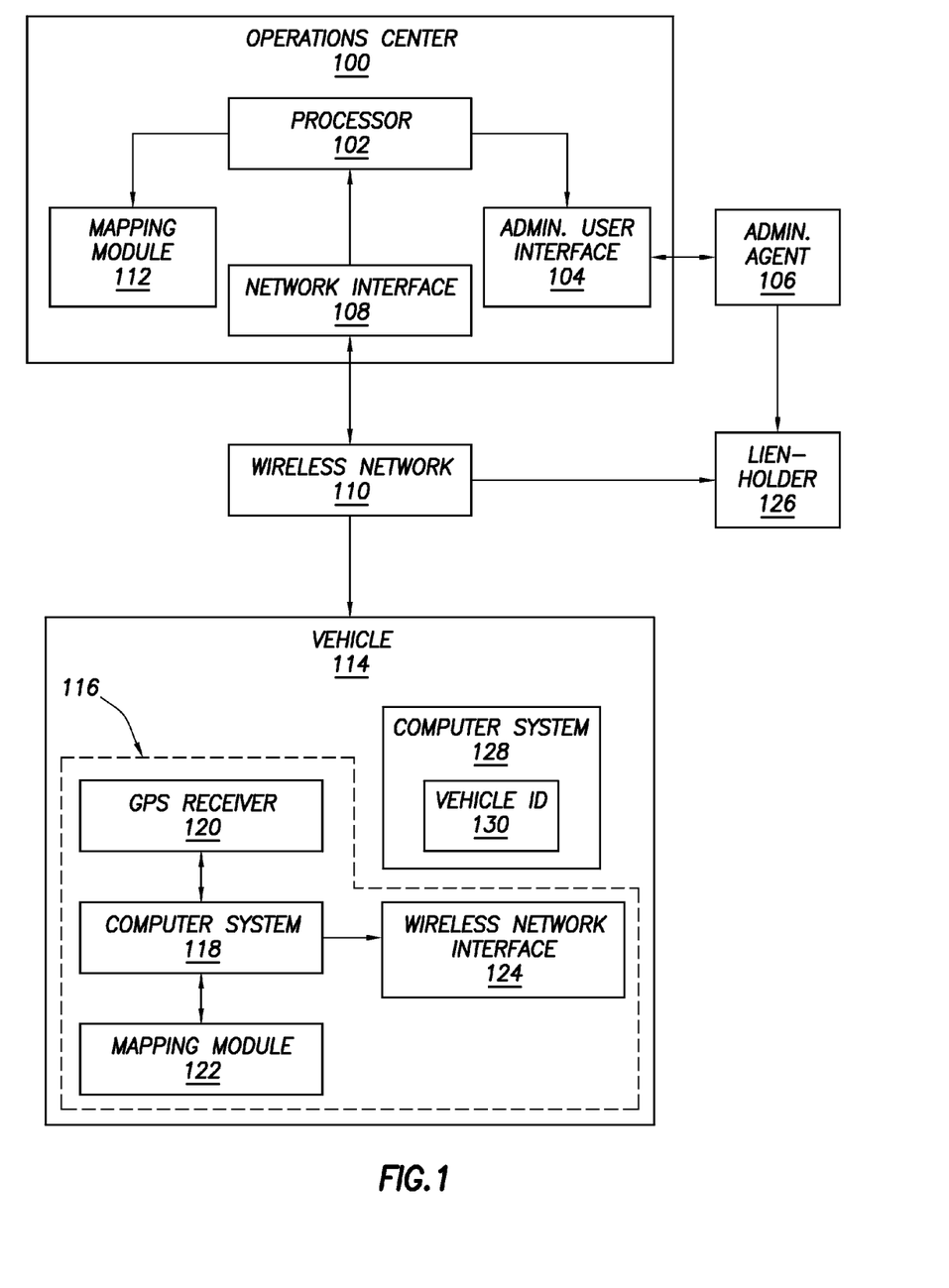
FIG. 1 shows, in block diagram form, a system in accordance with at least some embodiments.

FIG. 1 shows, in block diagram form, a system in accordance with at least some embodiments. In particular, the system comprises an operations center 100 communicatively coupled to a vehicle 114 by way of a wireless network 110. The operations center 100 comprises a processor 102. In some embodiments, the processor 102 may be a stand-alone computer system, or the processor may comprise a plurality of computer systems communicatively coupled and performing the functions of the operations center 100, the functions discussed more thoroughly below. The processor 102 may couple to an administrative user interface 104. The administrative user interface 104 may enable an administrative agent 106 to control or configure the operation of the system.

In one embodiment, in order to communicate with vehicle 114, the operations center 100 may further comprise a network interface 108 communicatively coupled to the processor 102. By way of the network interface 108, the processor 102, and any programs executing thereon, may communicate with vehicle 114, such as by wireless network 110. Wireless network 110 is illustrative of any suitable communications network, such as a cellular network, a Wireless Fidelity (Wi-Fi) network, or other mechanism for transmitting information between the operations center 100 and the vehicle 114.

In accordance with at least some embodiments, the operations center 100 is remotely located from the vehicle 114. In some cases, the operations center 100 and vehicle 114 may be located within the same city or state. In other cases, the operations center 100 may be many hundreds or thousands of miles from vehicle 114, and thus the illustrative wireless network 110 may span several different types of communication networks.

Still referring to FIG. 1, the system further comprises a vehicle 114 communicatively coupled to operations center 100 by way of the illustrative wireless network 110. The vehicle 114 may comprise tracking device 116 (shown within the dashed line). In some embodiments, the tracking device may be part of the vehicle 114 as purchased from the manufacturer (i.e., an original equipment manufacturer (OEM) device). In other embodiments, however, the tracking device may be part of a third-party after-market system.

Tracking device 116 may comprise a computer system 118. Although not specifically shown, computer system 118 may comprise a processor, where the processor may communicate with subsystems of the vehicle, such as a computer system 128 of the vehicle 114. An example onboard device 116 configured to couple to the onboard diagnostic two (OBD-II) port may also have the ability to read or determine data associated with the vehicle 114.

Tracking device 116 may further comprise a wireless network interface 124 coupled to the computer system 118. By way of the wireless network interface 112, programs executed by the computer system 118 may communicate with other devices. In some embodiments, the wireless network interface 124 enables the computer system 118 to communicate with operations center 100 by way of a wireless transmission through the wireless network 110. The wireless network interface 124 thus implements a wireless communication system and/or protocol.

The tracking device 116 further comprises a global position system (GPS) receiver 120 coupled to computer system 118. The GPS receiver 120 receives signals from an array of GPS satellites orbiting the earth, and based on timing associated with arrival of those signals, a location of the tracking device 116 (and thus the vehicle 114) can be determined. In some cases, the GPS receiver 120 has sufficient functionality to calculate location, and thus the data passed to computer system 118 may be a direct indication of location. In other cases, the functionality to determine location may be shared between the GPS receiver 120 and software executing on the processor 102, by way of wireless network 110. That is, the GPS receiver 120 may receive the plurality of GPS signals and pass the information to a program on the processor 102, which program may then make the determination as to location of the tracking device 116, and thus the vehicle 114. In still other cases, software executing on computer system 118 combined with information received by the GPS receiver 120 may make a determination as to the location of the tracking devices 116.

In one embodiment, the tracking device 116 tracks the vehicle with high precision, thus one may be able to identify the street and block at which the vehicle is passing at any given time (though the tracking device 116 may not necessarily have or contain street level databases). In other cases, the tracking device 116 may act only to determine the endpoints of each trip. In another embodiment, location tracking may be accomplished by way of cellular signal triangulation. For example, the wireless network interface may be a cellular transceiver implementing implement a wireless communication system and/or protocol (i.e., radio frequency communication by way of electromagnetic waves propagating through air).

In some cases, the location determined by the tracking device 116 may only be a position on the face of the earth, for example, latitude and longitude. The mapping module 112, located at the operations center 100 and receiving a stream of locations from the tracking device 116, may correlate to streets and addresses. In other cases, the tracking device 116 may have sufficient memory and computing functionality to not only determine position in a latitude and longitude sense, but also to correlate the positions to cities, streets, block numbers and addresses. The tracking device 116 coupled to vehicle 114 may further comprise its own mapping module 122 coupled to computer system 118. In accordance with at least some embodiments, the mapping module 122 may be a computer program or program package that operates or executes on the computer system 118 to perform a mapping function associated with the location of vehicle 114 and any geo-fences which may be activated on the tracking device 116.

Consider the following example situation. A lien-holder offers loans to finance the inventory of a car dealership. The dealership borrows funds in order to stock an inventory of vehicles, and repays the debt as the vehicles are sold. In order to protect the lien-holder's investment on the inventory, a representative from the lien-holder may make a periodic (e.g., monthly) physical count of the vehicles to ensure the accounting of each vehicle. The physical visit and physical accounting of the inventory is both costly and time-consuming. Furthermore, a physical accounting of the vehicles is prone to human error. As a result, the lien-holder may request that each vehicle on the lot be outfitted with a uniquely linked tracking device. Each tracking device is linked with an identification number 130 associated with a specific vehicle (e.g., a vehicle identification number (VIN), a dealer-assigned tracking number, or a lien-holder assigned tracking number). In accordance with a plurality of established and activated geo-fences (one each for each tracking device), the tracking devices track the locations of respective vehicles, thus making an accounting of the vehicles automated, fast, and less prone to error, and subsequently reducing the number of times a physical accounting must be made.

In order to track a vehicle, a geo-fence may be established for a variety of different situations. If the vehicle departs a geo-fenced area, an alert may be sent to the remote operations center, or directly to the lien-holder. If a vehicle is purchased, the tracking device is disassociated from the vehicle, which may be an indication for the lien-holder to request partial payment on the loan. Various techniques for associating a vehicle with a tracking device will be discussed first.

FIGS. 2A-2E show a plurality of identification and association technologies in accordance with a variety of embodiments. In particular, a plurality of technologies may be employed to read an identification number uniquely linked to the vehicle, and further associating the identification number with the tracking device coupled to the vehicle. For simplification, the following discussion will assume the identification number is a standardized Vehicle Identification Number (VIN), although the identification number need not be a VIN and may be any type of unique identification code.

Figure 2A:
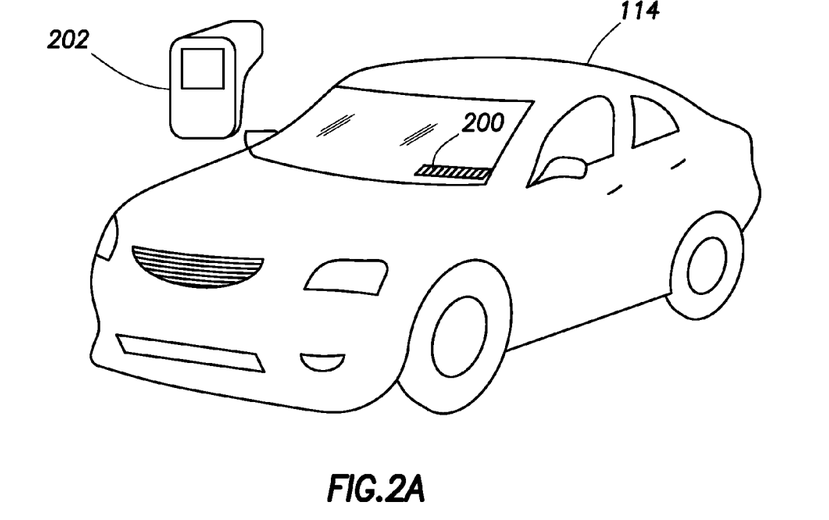
FIG. 2A shows a perspective view of an identification system in accordance with at least some embodiments.

FIG. 2A shows an example VIN identification method. In this example embodiment, vehicle 114 is tagged with an optical machine-readable representation containing VIN information, such as a bar code 200 or Quick Response Code (QR Code). The bar code 200 or QR code may contain VIN information including the manufacturer of the vehicle, the year of manufacture, the country of origin, the type of vehicle, and a unique serial number for vehicle 114 specifically. The bar code 200 may be affixed to the vehicle by way of a sticker or a label, or other adhesive means, or may be physically imprinted on the vehicle directly, (e.g., printed on the VIN tag behind the front windshield).

The bar code may be read and decoded by using a portable computing device, such as a handheld scanner 202. For example, the handheld scanner 202 may be a laser scanner, a charge-coupled device (CCD) reader, a camera-based reader, or a pen-type laser reader. In particular, a person (e.g., an employee of the dealership, a representative of the lien-holder, or another third-party) may use the handheld scanner to physically scan bar code 200. In another example, the scanner 202 need not be physically handled by a person, but may be mounted and machine controlled.

In the example system, decoded VIN information is then wirelessly transmitted to the computer system 118 of tracking device 116 coupled to vehicle 114. Alternatively, the handheld scanner 202 may transmit information to the tracking device 116 by way of a hardwired connection, such as by a universal serial bus (USB) cable. Once the tracking device 116 receives the vehicle specific VIN information, the tracking device 116 is associated with vehicle 114.

Figure 2B:
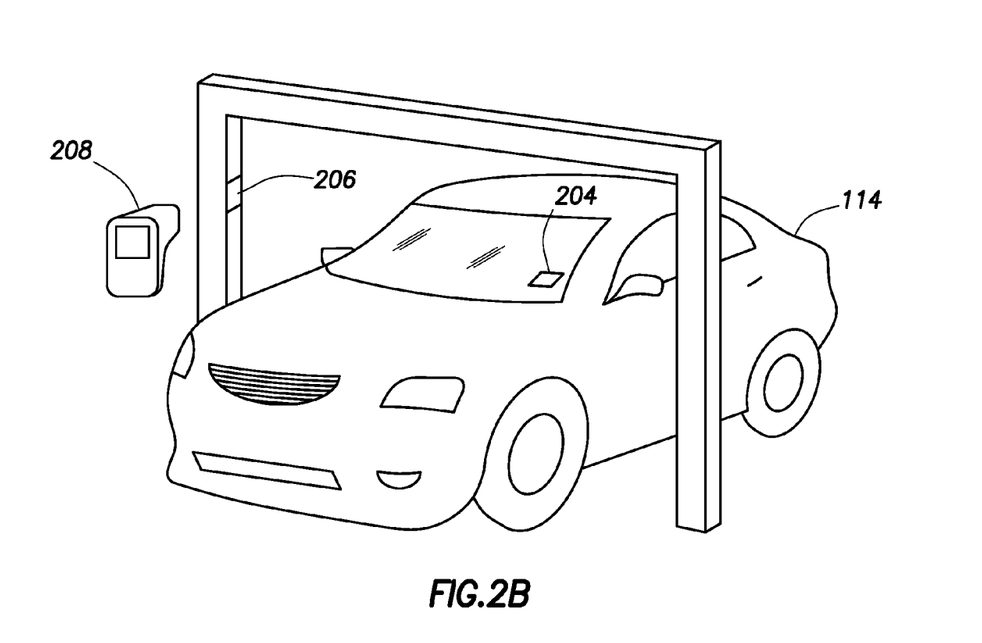
FIG. 2B shows a perspective view of an identification system in accordance with at least some embodiments.

In FIG. 2B, example vehicle 114 is associated with tracking device 116 by way of a radio frequency identification (RFID) chip. In particular, the VIN associated with vehicle 114 may be embedded within an RFID chip 204 attached to the vehicle. In one embodiment, the information on the RFID chip may be decoded by a handheld two-way radio transceiver 208. Transceiver 208 sends an electromagnetic query signal to the RFID chip, and then reads the signal received from the RFID chip in return. In the example system, the transceiver then wirelessly transmits the RFID chip response to the computer system 118 in order to associate the VIN information from vehicle 114 with tracking device 116. Alternatively, the transceiver 208 may transmit information to the tracking device 116 by way of a hardwired connection, such as by a universal serial bus (USB) cable.

In another embodiment, the RFID chip 204 may be read as the vehicle passes by an RFID scanner, where the scanner may be embedded in a portion of a physical gate 206 into the dealership lot 300. In particular, because the RFID chip 204 may be read at short ranges via electric or magnetic fields, or by way of emitted radio waves, the RFID chip 204 may be read from up to several meters away, and unlike scanning a bar code, the RFID chip 204 need not be within the line of sight of a handheld reader. Thus, where an individual may physically scan each bar code (or each RFID tag, in some embodiments), it may also be possible for the RFID chip 204 to be read and decoded as vehicle 114 is driven past the RFID scanner 208 and onto the dealership lot 300 for the first time.

Although discussion with regard to the handheld scanners in both the bar code technology and RFID technology has involved the scanner directly providing the tracking device computer system with the VIN information, it is also contemplated the handheld devices 202 and 208 may transmit the VIN information first to another remote computer system (e.g., the remote operations center 100), where the remote computer system in turn transmits the information to the tracking device 116.

Figure 2C:
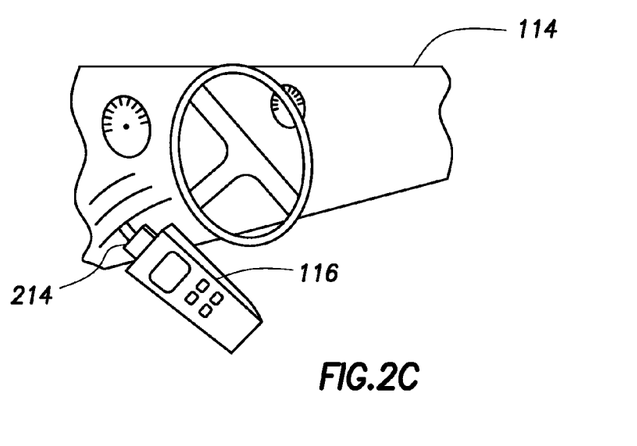
FIG. 2C shows a perspective view of an identification system in accordance with at least some embodiments.

FIG. 2C shows yet another embodiment in which the tracking device may be associated with the vehicle. In particular, the tracking device 116 may receive VIN information from the computer system 128 of vehicle 114. For example, the tracking device 116 is coupled to the OBD-II port 214 in order to read or determine data associated with the vehicle, including reading the VIN, as well as associating the tracking device 116 with vehicle 114.

Figure 2D:
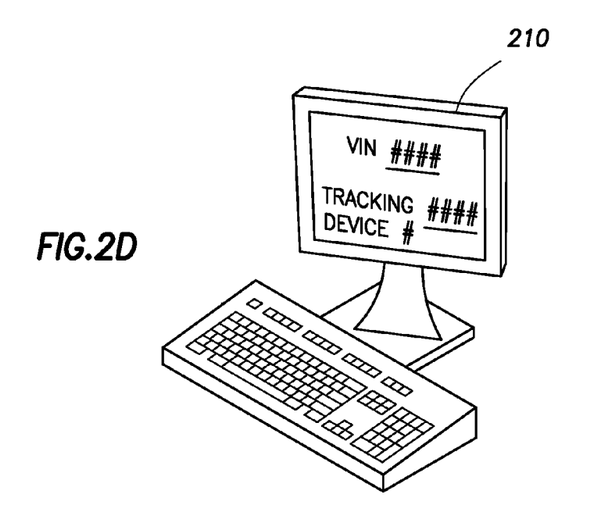
FIG. 2D shows an elevation view of an identification system in accordance with at least some embodiments.

FIG. 2D shows yet another embodiment in which the tracking device may be associated with the vehicle. In particular, the tracking device may be associated with a unique serial number as well. Both the serial number of the tracking device and the VIN for vehicle 114 may be manually entered into a computer program running on a computer system 210 at a remote location, such as at operations center 100.

Figure 2E:
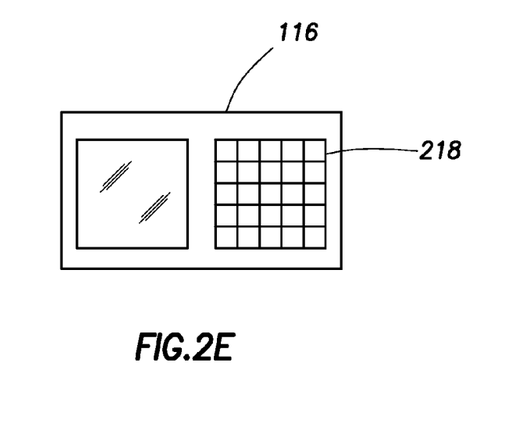
FIG. 2E shows an elevation view of an identification system in accordance with at least some embodiments.

FIG. 2E shows yet another embodiment in which the tracking device may be associated with the vehicle. In particular, the tracking device 116 may comprise an input device 218, where the input device may be, for example, a touchscreen or a tactile keypad. In this example embodiment, the VIN information for vehicle 114 may be physically entered directly into the tracking device 116.

Once the tracking device 116 has been associated with the vehicle 114 by way of the unique identifier (e.g., the VIN), the vehicle's location with respect to a geo-fence may be tracked. Various techniques for activating a geo-fence, as well as monitoring the location of a vehicle are now discussed.

Figure 3:
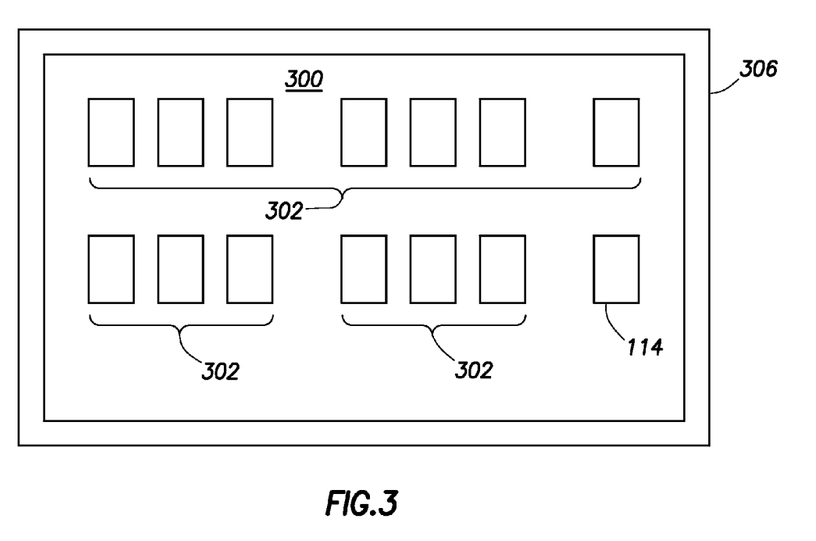
FIG. 3 shows an overhead view of an established and/or activated geo-fence in accordance with at least some embodiments.

FIG. 3 shows an overhead view of a geo-fence in accordance with at least some embodiments. In particular, FIG. 3 shows a dealership lot 300 containing multiple vehicles 302, as well as example vehicle 114. Each vehicle being financed by the lien-holder has been coupled to and associated with a tracking device. Responsive to the acknowledgement that at least one vehicle on the dealership lot 300 is associated with a tracking device, a geo-fence may be established to aid in tracking the location of the vehicle inventory. In the event a vehicle departs the geo-fenced area, an alert will be sent to a remote location informing any interested party (e.g., the dealership, the lien-holder) that the vehicle is no longer on the dealership lot 300.

In some cases, mapping module 112 of the remote operations center 100 may play a role in establishing the geo-fence when a vehicle is within the coordinates of the dealership lot 300. In particular, the mapping module may receive information from the tracking device 116 regarding the vehicle location, as well as other related information (e.g., the time of day, whether the vehicle is schedule for a test-drive, whether the vehicle is schedule for maintenance), and the operations center establishes the relevant geo-fence boundary.

In other cases, the tracking device 116 may establish the geo-fence. In particular, the GPS receiver, receiving timing signals from the satellites, passes the location information to computer system 118. Computer system 118 processes the information received from the GPS receiver 120, and establishes an appropriate geo-fence boundary. Regardless of how the geo-fence boundary is established, once the geo-fence boundary is established, movement of the vehicle with respect to the geo-fence is monitored.

Still referring to FIG. 3, a geo-fence 306 is established along the perimeter of the dealership (shown offset for illustration purposes). While a vehicle is located within the boundary of geo-fence 306, the vehicle is accounted for in the inventory. If a vehicle is crosses out of the area bounded by geo-fence 306, an alert may be sent to the operations center 100 or the lien-holder 126 that the vehicle has departed the lot. In some cases, notification that the vehicle has left the lot is indicative of unauthorized departure, thus prompting potential investigation.

In addition to monitoring when a vehicle leaves the geo-fenced area without authorization, it is also possible that vehicles recognized as being located within the geo-fence 306 correspond to an accurate and correct inventory accounting of vehicles in which the lien-holder has a financial interest. When the lien-holder wants an inventory, a query regarding the vehicles on the lots can be performed automatically and without human interaction (outside of requesting the data from the operations center).

In one embodiment, geo-fence 306 is established by the remote operations center 100 for all of the vehicles on the lot in total. In other words, geo-fence 306 is established regardless of how many vehicles are present on the dealership lot 300, and regardless of whether any of the vehicle has its own situational geo-fence established (e.g., a test-drive geo-fence). In another embodiment, each tracking device coupled to a vehicle individually establishes a default geo-fence 306 corresponding to the dealership perimeter for the specific vehicle to which the tracking device is coupled. In other words, in some example cases, there are multiple geo-fences having the same size, shape and location; one for each vehicle on the dealership lot 300.

Referring again to FIG. 3, geo-fence 306 is established around vehicles 302, including example vehicle 114. During the time period that example vehicle 114 is located within the boundary created by geo-fence 306, vehicle 114 is accounted for on the lot 300. In some cases, the geo-fence 306 defining the boundary of the dealership may be activated 24 hours a day, such that at any point the location of each vehicle may be known. In other cases, the geo-fence 306 may be activated only part of the day, such as the hours during which the dealership is closed. In cases where the geo-fence 306 is individually established for individual vehicles, each vehicle may have its own specific geo-fence activation rules.

In the event vehicle 114 departs the area bounded by geo-fence 306 (i.e., the dealership lot geo-fence), the tracking device will send a message indicating a geo-fence violation. In one embodiment, the message may be sent from the tracking device to the operations center 100. In another embodiment, the message may be sent from the tracking device directly to the lien-holder 126. In yet another embodiment, the tracking device may send a message to the operations center, and then the operations center will send a message to the lien-holder.

In some instances, a geo-fence violation is indicative of an unauthorized departure, and may trigger an investigation by the dealership or by the lien-holder. For example, if a vehicle is stolen, when it is removed from the dealership the operations center and/or lien holder will receive a message that a vehicle has departed the lot without the knowledge of either or both parties. However, in some instances, the vehicle will have a legitimate reason for departing the area bounded by the dealership geo-fence 306, such as for a test drive, for maintenance, or to transfer the vehicle from one dealership location to another dealership location.

If the vehicle leaves the dealership lot 300 with previous knowledge and authorization, a new geo-fence may be established to monitor the vehicle outside of the dealership. Circumstantial geo-fences may be established for a vehicle in a variety of ways and for a variety of reasons, as discussed with reference to FIG. 4.

Figure 4:
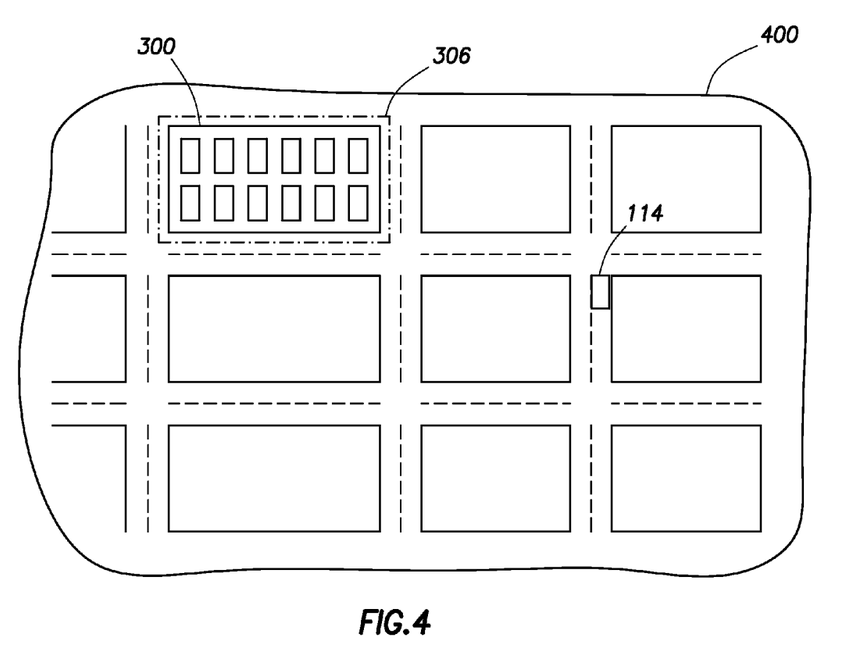
FIG. 4 shows an overhead view of an established and/or activated geo-fence in accordance with at least some embodiments.

FIG. 4 shows two geo-fences in accordance with at least some embodiments. In particular, FIG. 4 shows dealership lot 300 bounded by default geo-fence 306, as well as a new circumstantial geo-fence 400 for vehicle 114. In this example, vehicle 114 departed, with previous knowledge, the dealership lot geo-fence 306, but is still under the control of the dealership (i.e., the vehicle has not been sold or otherwise disassociated with the tracking device). As a result of the departure, circumstantial geo-fence 400 has been established as having a specific size, shape, and location in relation to the dealership.

In one embodiment, the geo-fence 400 may have a predefined size, shape, and location. For example, if geo-fence 400 is a test-drive geo-fence, geo-fence 400 may extend outwardly from the dealership, and having a radius of five miles. In another example, it may be possible to define the geo-fence as being defined by street coordinates. In particular, it may be possible to define the area bounded by the geo-fence by the following example street coordinates: the area south of E 15$^{th}$ Street; east of N Lamar Boulevard; north of Caesar Chavez Street; and west of Red River Street.

In another embodiment, the circumstantial geo-fence 400 may be established in real-time. For example, while some geo-fences may be predefined to define a perimeter around the dealership, or may be predefined to define an area to accommodate a test-drive or maintenance trip, it may be possible to establish a circumstantial geo-fence in real-time specific to the circumstances at hand. For example, the dealership may be located in a city setting, but sells off-road type vehicles. A potential purchaser may want to test drive the vehicle in a location that is more similar to off-road conditions than urban city streets can provide. Thus, the operations center or the tracking device may receive real-time commands to establish a geo-fence outside the regular five-mile radius test drive geo-fence. In another example, in another example, a 16-year old looking to purchase his first vehicle may be given a smaller geo-fence area in which to test-drive the vehicle. In yet another example, the geo-fence may be altered to consider a specific path over which the vehicle may be test-driven, or a specific path to reach another dealership or to receive maintenance. Thus, the geo-fence need not be circular, oval, or square in shape, and may be any shape or size contemplated.

Although additional geo-fences may be established for specific circumstance in addition to established dealership lot 300 geo-fence 306, it is also possible that specific circumstances regarding vehicles leaving the lot with authorization are handled with only geo-fence 306 and a timer.

For example, in another embodiment, geo-fence 306 is established and activated around dealership lot 300. For an authorized purpose, not including the sale of the vehicle, vehicle 114 departs dealership lot 300. Instead of a new geo-fence being established for vehicle 114, the tracking device and/or operations center delays sending a message of a geo-fence violation for some predetermined time, such as 30 minutes for a test drive or an example five hours for a maintenance trip. If vehicle 114 does not return to the area bounded by geo-fence 306 within the predetermined time period, then the tracking device and/or operations center will send a message of an unauthorized departure.

In yet another embodiment, the geo-fences established may be established on a time basis. For example, the geo-fence 306 may be activated during the hours the dealership is closed (e.g., 5:00 p.m. to 8:00 a.m.) to monitor the location of the vehicles when there are no employees nearby to monitor the location of the vehicles. Alternatively, specifically sized geo-fences may be set to activate and de-active on varying time bases. Thus, not all of the geo-fences established need necessarily be activated on the same time schedule, and may vary based on a variety of pre-determined rules.

Overall, when a geo-fence is established around a vehicle, the lien-holder or dealership is interested in the location of the vehicle. As discussed previously when a vehicle enters and/or exits an area bounded by a geo-fence, a message is sent regarding the movement and/or location of the vehicle.

In one embodiment, a message is sent at the time the vehicle crosses the geo-fence. The message may be sent directly from the tracking device to the operations center; directly from the tracking device to the lien-holder (or other third party); from the tracking device to the operations center, and then subsequently from the operations center to the tracking device; or from the tracking device to another indicated third-party.

In another embodiment, the tracking device may be instructed to send a message regarding the vehicle crossing the geo-fence after a specific period of time has elapsed. For example, the dealership has elected to not establish specific geo-fences for test drives, but rather has elected to provide a 30 minute window for test-drives. Thus, while the tracking device may recognize the vehicle has crossed over the geo-fence and is exiting the lot, the tracking device is also aware that this movement is a test-drive, and waits to send a message unless the vehicle is not recognized as returning to the lot within a 30 minutes time period.

In yet another embodiment, the tracking device may send a message regarding the movement and location of the vehicle only when queried by the operations center. For example, at the time a lien-holder is interested in the location of the financed vehicles, the lien-holder may ask the dealership to conduct a count by way of messages sent from the respective tracking devices.

The messages sent from the tracking device may provide varying degrees of information. In one embodiment, the tracking device may simply send a message indicating the vehicle has entered or exited the area bounded by the geo-fence. In another embodiment, the tracking device may send a message indicative of movement in relation to the geo-fence, tracking the location of the vehicle, and send indications of location of the vehicle. In yet another embodiment, the tracking device may send a message indicating the geo-fence has been breached and sends an indication of last-known location when the ignition of the vehicle has been deactivated.

At some point after the tracking device has been coupled to the vehicle, and the vehicles movements monitored with respect to the geo-fence(s) established, tracking device may be disassociated with the vehicle.

Now consider a situation where the vehicle 114, coupled to the tracking device 116, is sold. No longer needing to track the location of the vehicle, the tracking device is disassociated from the vehicle. While the tracking device itself may remain coupled to the vehicle for other functions, the association between the vehicle's VIN and the geo-fence location tracking is no longer linked. The disassociation may be accomplished by removing the sold vehicle's VIN from the dealership's inventory database. In another example, the VIN number may remain associated with the tracking device, but a program linking the tracking device with geo-fence monitoring is turned off. In yet another example, the tracking device may be physically disconnected from the vehicle, thus effectively disassociating the tracking device with the vehicle.

In another embodiment, the tracking device may be disassociated due to tampering. For example, the tracking device may be removed from the vehicle, thus severing power to the tracking device, and effectively disabling the tracking device's ability to monitor the location of the vehicle and send messages. The disassociation may be detected by detecting loss of communicative coupling to the computer system of the vehicle. In yet another example, the tracking device from one vehicle may be removed and subsequently coupled to another, different, vehicle. The disassociation may be detected by detecting communicative coupling to the computer system of the different vehicle. In this example, tracking device 116 is still programmed to report the movement and location of vehicle 114, but since it has been removed and coupled to another vehicle, in actuality the tracking device 116 is monitoring the location of another vehicle.

When disassociation of a tracking device with a vehicle is detected, a message is sent to the operations center, to the lien-holder, or the lien-holder via message first to the operations center. In one embodiment, the message sent in response to a disassociation may inform the lien-holder that a vehicle has been sold, and thus the vehicle should be removed from the inventory. In another embodiment, the message sent in response to a disassociation informs the lien-holder and/or the dealership that there has been tampering with one of the tracking devices, and may thus trigger an investigation as to the location of the previously associated vehicle.

In addition to monitoring the location of a vehicle with respect to one or more geo-fences, the tracking device coupled to the vehicle may have the capability to perform other actions. In one embodiment, the tracking device may receive operating power from the vehicle battery, and may be able to detect a loss of charge in the battery. In the event a loss of charge is detected by the tracking device, the tracking device may send a message to the dealership or to the operations center that a low battery is detected in the vehicle.

In another embodiment, the tracking device may have the capability to send a signal to the vehicle computer to lock or unlock the vehicle. For example, the vehicle computer may receive instructions from the tracking device to automatically engage the locks on the vehicle at 8:00 p.m. and to automatically disengage the locks at 8:00 a.m. In another example, the tracking device may send a message to the operations center that a vehicle is not locked after business hours, and a command may be issued in real-time to lock the vehicle (or to unlock the vehicle if the vehicle is locked during business hours). In another embodiment, before the tracking device sends a signal to the vehicle computer to lock the vehicle, the tracking device may first determine the location of the vehicle. More specifically, the tracking device may instruct the vehicle computer to lock the vehicle only if the vehicle is located within the dealership lot geo-fence 306. This location check may thus prevent a situation where a customer is inadvertently locked out of the vehicle on test-drive occurring after business hours.

Figure 5:
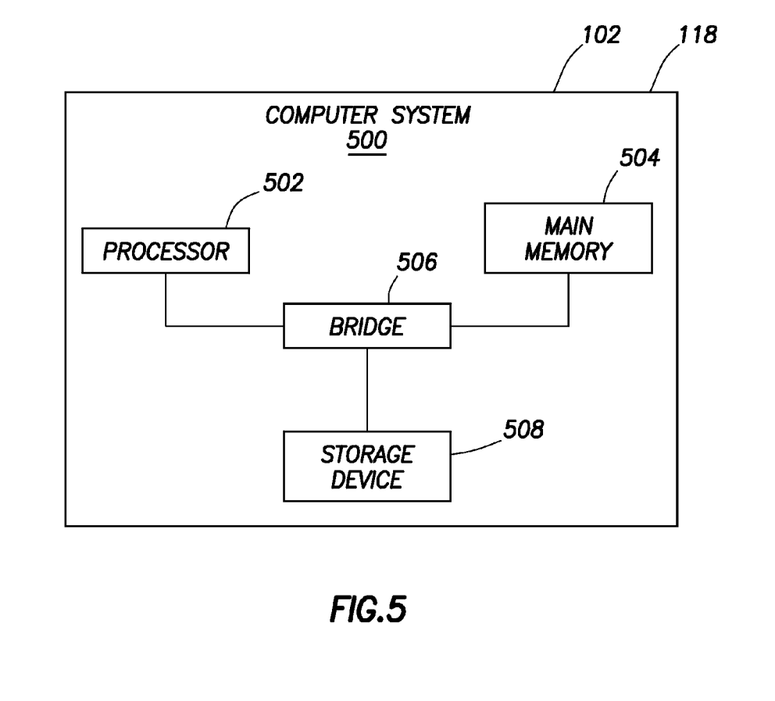
FIG. 5 shows a computer system in accordance with at least some embodiments.

FIG. 5 shows a computer system 500, which is illustrative of a computer system upon which the various embodiments may be practiced. The computer system 500 may be illustrative of, for example, computer system 118 coupled to the onboard device 116. In yet another embodiment, computer system 500 may be illustrative of processor 102. In particular, computer system 500 comprises a processor 502, and the processor couples to a main memory 504 by way of a bridge device 506. Moreover, the processor 502 may couple to a long term storage device 508 (e.g., a hard drive, solid state disk, memory stick, optical disc) by way of the bridge device 506. Programs executable by the processor 502 may be stored on the storage device 508, and accessed when needed by the processor 502. The program stored on the storage device 508 may comprise programs to implement the various embodiments of the present specification, such as sending an indication of the last known location of vehicle 114 in the event of device tampering. In some cases, the programs are copied from the storage device 508 to the main memory 504, and the programs are executed from the main memory 504. Thus, the main memory 504, and storage device 508 shall be considered computer-readable storage mediums.

Figure 6:
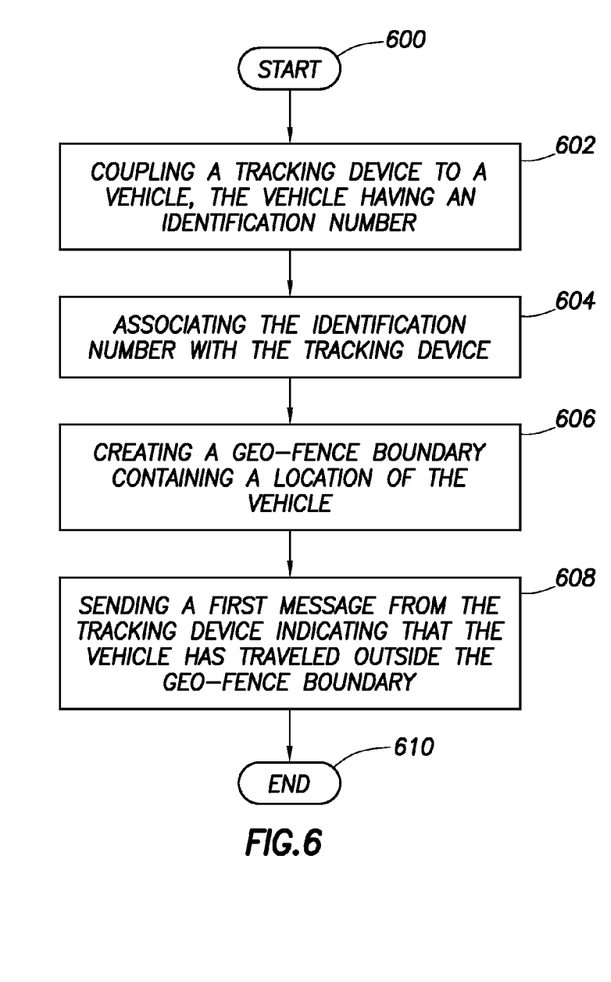
FIG. 6 shows, in block diagram form, a method in accordance with at least some embodiments.

The method of tracking an associated vehicle will now be discussed in more detail. FIG. 6 shows a flow diagram depicting an overall method of associating a vehicle with a tracking device, and subsequently tracking the vehicle. The method starts (block 600), and continues with coupling a tracking device to a vehicle, the vehicle having an identification number (block 602); associating the identification number with the tracking device (block 604); creating a geo-fence boundary containing a location of the vehicle (block 606); sending a first message from the tracking device indicating that the vehicle has traveled outside the geo-fence boundary (block 608). Thereafter, the method ends (block 610).

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments," or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, the various embodiments have been described in terms of vehicle inventory tracking for lien-holders. This context, however, shall not be read as a limitation as to the scope of one or more of the embodiments described—the same techniques may be used for other embodiments. It is intended that the following claims be interpreted to embrace all such variations and modifications.

We claim:

1. A method comprising:
coupling a tracking device to a vehicle, the vehicle having an identification number;
associating the identification number with the tracking device;
creating a geo-fence boundary containing a location of the tracking device;
monitoring location of the tracking device relative to the geo-fence boundary;
detecting coupling of the tracking device to a different vehicle, the coupling determined by way of detecting communicative coupling to a computer system of the different vehicle; and responsive to the coupling to the different vehicle;
sending a first message from the tracking device indicating coupling of the tracking device to the different vehicle.

2. The method of claim 1 wherein creating the geo-fence boundary further comprises creating by at least one method selected from the group consisting of: creating responsive to the association of the identification number; and creating the geo-fence responsive to a command from a financing entity having an interest in the vehicle.

3. The method of claim 1 wherein associating the identification number with the tracking device further comprises:
coupling the tracking device to a computer system of the vehicle; and
reading a manufacturer assigned vehicle identification number (VIN) by the tracking device from the computer system of the vehicle.

4. The method of claim 1 wherein associating the identification number with the tracking device further comprises providing the identification number to the tracking device by way of a portable electronic device communicatively coupled to the tracking device.

5. The method of claim 1 wherein detecting communicative coupling to the computer system of the different vehicle further comprises receiving an identification number of the different vehicle.

6. The method of claim 1 wherein sending the first message further comprises sending the message to an operations center.

7. The method of claim 6 further comprising sending a second message from the operations center to a lien-holder of the vehicle that the tracking device has been tampered with.

8. The method of claim 1 wherein sending the first message further comprises sending the first message from the tracking device to a lien-holder.

9. A tracking device comprising:
a processor;
a memory coupled to the processor;
a wireless transceiver coupled to the processor; and
a global positioning system (GPS) receiver coupled to the processor;
the memory storing a program that, when executed by the processor, causes the processor to:
receive an identification number of a vehicle to which the system is coupled;
create a geo-fence boundary, where the geo-fence boundary contains a location of the tracking device when the geo-fence is created;
monitor location of the tracking device relative to the geo-fence boundary, the monitoring by way of the GPS receiver;
send a boundary violation message to a lien-holder by way of the wireless transceiver if the vehicle has crossed the geo-fence boundary; and
send a tamper message to the lien-holder by way of the wireless transceiver if the tracking device is coupled to a computer system of a different vehicle, the coupling without authorization.

10. The tracking device of claim 9 wherein when the processor creates the geo-fence boundary, the program causes the processor to create the geo-fence boundary responsive to receipt of the identification number of the vehicle.

11. The tracking device of claim 9 wherein when the processor creates the geo-fence boundary, the program causes the processor to create the geo-fence boundary responsive to a command from a lien-holder on the vehicle.

12. The tracking device of claim 9 further comprising:
a connector configured to couple to an onboard diagnostic version II (OBD-II) port of a vehicle, electrical conductors of the connector communicatively coupled to the processor; and
wherein when the processor receives the identification number, the program causes the processor to receive a manufacturer assigned vehicle identification number across the connector.

13. The tracking device of claim 9 wherein when the processor receives the identification number, the program causes the processor to receive the identification number from a portable computing device communicatively coupled to the tracking device.

14. The tracking device of claim 9 wherein when the processor sends the boundary violation message, the program causes the processor to send the boundary violation message to an operations center by way of the wireless transceiver.

15. The tracking device of claim 9 wherein when the processor sends the boundary violation message, the program causes the processor to send the boundary violation message to a lien-holder by way of the wireless transceiver.

16. The tracking device of claim 9 wherein when the processor sends, the program causes the processor to send the boundary violation message if the vehicle has crossed the geo-fence boundary and not returned within a predetermined period of time designated for a test drive of the vehicle.

17. The tracking device of claim 9 wherein the program further causes the processor to:
receive a test-drive message indicating the vehicle is to be taken for a test drive; and
expand the geo-fence boundary responsive to the test-drive message.

18. The tracking device of claim 9 wherein the program further causes the processor to detect tampering by detection of loss of communicative coupling to the computer system of the vehicle.

19. A method comprising:
coupling a tracking device to a vehicle, the vehicle having an identification number;
associating the identification with the tracking device;
creating a geo-fence boundary containing a location of the tracking device;
monitoring location of the vehicle relative to the geo-fence boundary by way of the tracking device;
disassociating the tracking device in response to no longer having a need to track the vehicle;
sending a first message from the tracking device.

20. The method of claim 1 further comprising, before associating the identification number with the tracking device, determining the identification number by way of at least one selected from the group consisting of: reading a bar code; reading a quick response code; reading a radio frequency identification chip; receiving the identification number by way of a input device communicatively coupled to the tracking device.

21. An apparatus comprising:
a processor; and
a memory coupled to the processor;
the memory storing a program that, when executed by the processor, causes the processor to:
associate an identification number of a vehicle coupled to the tracking device with the tracking device;
create a geo-fence boundary containing a location of the tracking device;
monitor location of the tracking device relative to the geo-fence boundary;
detect coupling of the tracking device to a different vehicle, the coupling determined by way of detecting communicative coupling to a computer system of the different vehicle; and responsive to the coupling to the different vehicle;
send a first message from the tracking device indicating coupling of the tracking device to the different vehicle.

22. The tracking device of claim 9 wherein the program further causes the processor to:
receive a test drive message indicating the vehicle is to be taken for a test drive wherein the test drive message indicates a driver age of sixteen years or less; and
reduce the geo-fence boundary responsive to the test drive message.

* * * * *